United States Patent
Ejiri (10) Patent No.: US 8,046,630 B2
(45) Date of Patent: Oct. 25, 2011

(54) STORAGE CONTROL APPARATUS, STORAGE CONTROL METHOD, AND COMPUTER PRODUCT

(75) Inventor: Arata Ejiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 427 days.

(21) Appl. No.: 11/881,871

(22) Filed: Jul. 30, 2007

(65) Prior Publication Data

US 2008/0086610 A1 Apr. 10, 2008

(30) Foreign Application Priority Data

Oct. 6, 2006 (JP) ................................. 2006-275821

(51) Int. Cl.
*G06F 11/00* (2006.01)
(52) U.S. Cl. ............................. 714/6.3; 714/42; 711/162
(58) Field of Classification Search .................. 714/5, 6, 714/7, 42, 6.3; 711/162, 117
See application file for complete search history.

(56) References Cited

U.S. PATENT DOCUMENTS

| | | | | |
|---|---|---|---|---|
| 6,105,116 | A * | 8/2000 | Mori | 711/162 |
| 6,785,789 | B1 * | 8/2004 | Kekre et al. | 711/162 |
| 6,912,631 | B1 * | 6/2005 | Kekre et al. | 711/162 |
| 6,978,354 | B1 * | 12/2005 | Kekre et al. | 711/162 |
| 7,089,448 | B2 * | 8/2006 | Hinshaw et al. | 714/6 |
| 7,290,101 | B1 * | 10/2007 | Kekre et al. | 711/162 |
| 2001/0037473 | A1 * | 11/2001 | Matsuura et al. | 714/5 |

FOREIGN PATENT DOCUMENTS

| | | |
|---|---|---|
| JP | 2004-334739 | 11/2004 |
| JP | 2006-330779 | 12/2006 |

OTHER PUBLICATIONS

Hiratsuka et al.; "Implementation of a parallel Directory Structure Fat-Btree on nCUBE3"; pp. 1-7.
Partial English language translation of an Office Action issued by the Patent Office of Japan for corresponding Japanese Application No. 2006-275821, mailed Aug. 23, 2011.

* cited by examiner

*Primary Examiner* — Philip Guyton
(74) *Attorney, Agent, or Firm* — Greer, Burns & Crain, Ltd.

(57) ABSTRACT

A controller updates a partition arrangement table and a backup-disk management table. The controller also creates, in a first disk, a logical memory area for storing a backup directory that has been stored in the first disk and that corresponds to a primary directory stored in a second disk of a processing element in which a failure has occurred.

12 Claims, 10 Drawing Sheets

| PARTITION ID | DISK ID |
|---|---|
| 1 | 1 |
| 2 | 2 |
| 3 | 3 |
| 4 | 4 |

FIG.5

| PRIMARY DISK ID | BACKUP DISK ID |
|---|---|
| 1 | 2 |
| 2 | 3 |
| 3 | 4 |
| 4 | 1 |

FIG.6

| PARTITION ID | DISK ID |
|---|---|
| 1 | 2 |
| 2 | 2→3 |
| 3 | 3 |
| 4 | 4 |

FIG.7

| PRIMARY DISK ID | BACKUP DISK ID |
|---|---|
| 1 | 2→3 |
|  |  |
| 3 | 4 |
| 4 | 1 |

FIG.8

| PHASE | PHASE CONTENTS | TARGET PROCESSING ELEMENT | PHASE TERMINATION STATE |
|---|---|---|---|
| 1 | ABORT AND ROLLBACK | OTHER THAN FAILED PROCESSING ELEMENT | ROLLBACK IS COMPLETED |
| 2 | RECOVER DIRECTORY | PROCESSING ELEMENT ON RIGHT SIDE OF FAILED PROCESSING ELEMENT | CLIENT-REQUEST RECEIPT IS RESTARTED |
| 3 | REPRODUCE BACKUP | PROCESSING ELEMENTS ON RIGHT AND LEFT SIDES OF FAILED PROCESSING ELEMENT | RECOVERY IS COMPLETED |

STORAGE CONTROL APPARATUS, STORAGE CONTROL METHOD, AND COMPUTER PRODUCT

BACKGROUND OF THE INVENTION

1. Field of the Invention

The present invention generally relates to a technology for backing up and restoring data.

2. Description of the Related Art

Figure 11:
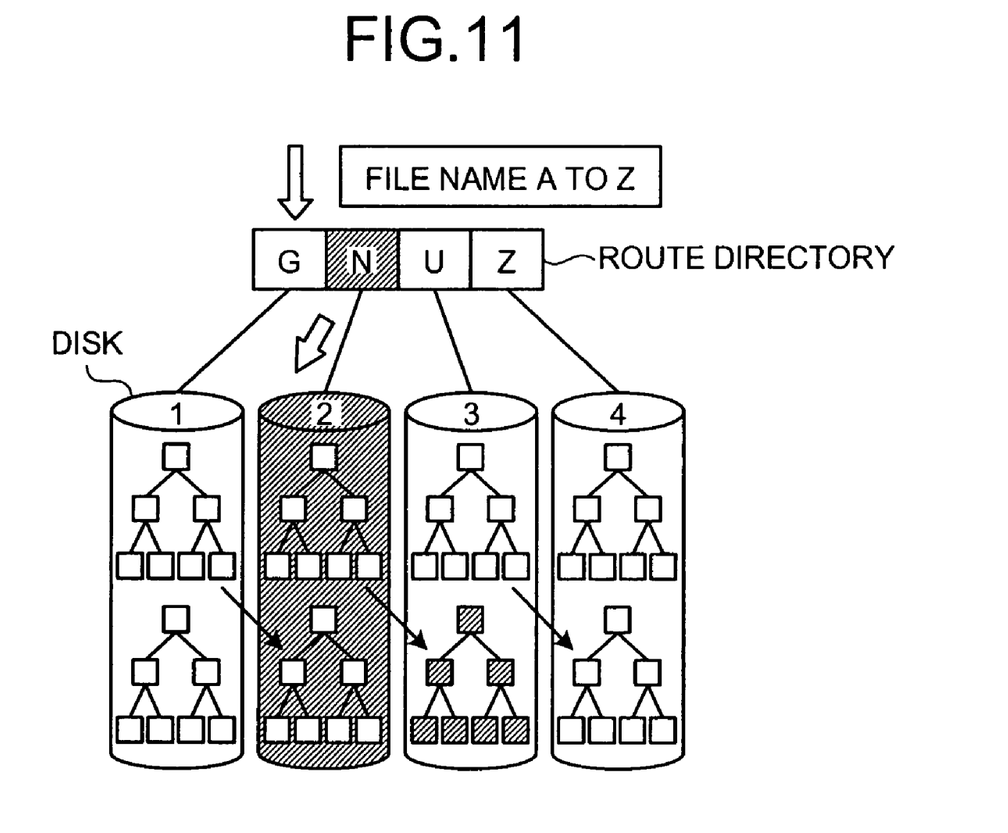
FIGS. 11 and 12 are schematics for explaining a conventional technology.

A technology for recovering from a failure occurred in a storage device that constitutes an autonomous-distributed storage system has been disclosed. The autonomous-distributed storage system autonomously searches a location to read or write data without using an integrated management server. For example, a technology for recovering from a system failure such as data access failure in an autonomous-distributed storage system is disclosed in, for example, "Implementation of the Fat-Btree on nCUBE3", Ryutaro Hiratsuka, et al., [online], [searched on Sep. 13, 2006], Internet URL: http://yokota-www.cs.titech.ac.jp/~yokota/papers, dews99-2.PDF. The autonomous-distributed storage system has a directory structure (see FIG. 11) in which a route directory is shared by disks (i.e., disks 1 to 4), while other directories are distributed and held by the respective disks to enable an effective data search.

Figure 12:
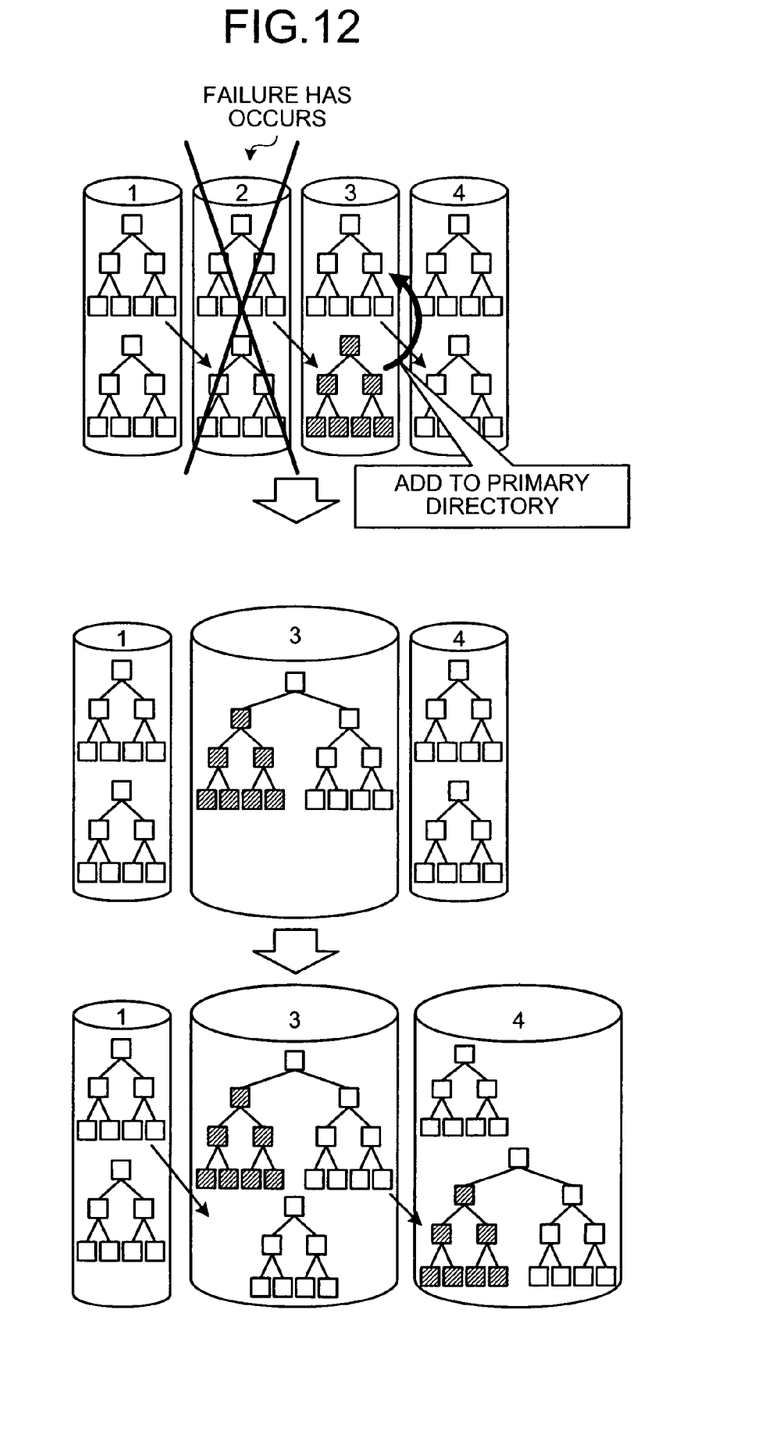

More specifically, as shown in FIG. 12, if a failure occurs in a storage device 2, a backup directory for the storage device 2 that is stored in a storage device 3 is added to a primary directory of the storage device 3, and a new primary directory is created. A backup directory corresponding to the newly created primary directory of the storage device 3 is stored in a storage device 4, and a backup directory corresponding to a primary directory of a storage device 1 is stored in the storage device 3. Thus, a primary directory of the storage device 2 is restored and data access is enabled.

However, in the conventional technology, if the system is disabled due to a failure, it takes time for the system to be recovered. In other words, the recovery process of the primary directory shown in FIG. 12 requires an amount of time equivalent to that taken to perform a process of actually adding data to the primary directory. Therefore, if a failure such as a storage-device failure occurs in the system, the system requires a considerable amount of time to recover from the disabled state and allow data access.

SUMMARY OF THE INVENTION

It is an object of the present invention to at least partially solve the problems in the conventional technology.

According to an aspect of the present invention, a storage control apparatus that includes a plurality of storage units connected with one another via a network and control original data and backup data stored in the storage units, the storage units including a first storage unit that stores therein first original data and a second storage unit that stores therein second original data and backup data of the first original data, includes a failure detecting unit that detects an occurrence of a failure in at least the first storage unit, and a logical-memory-area creating unit that creates, upon detection of the failure, a logical memory area in the second storage unit, in which the backup data is to be stored as the first original data.

According to another aspect of the present invention, a storage control method that is applied to a storage control apparatus including a plurality of storage units connected with one another via a network and controlling original data and backup data stored in the storage units, the storage units including a first storage unit that stores therein first original data and a second storage unit that stores therein second original data and backup data of the first original data, includes detecting an occurrence of a failure in at least the first storage unit, and creating, upon detection of the failure, a logical memory area in the second storage unit, in which the backup data is to be stored as the first original data.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings. In an embodiment described below, the present invention is applied to a storage system that includes a plurality of processing elements. The processing elements each include a controller that functions as a storage control apparatus, and are connected via a network.

Figure 1:
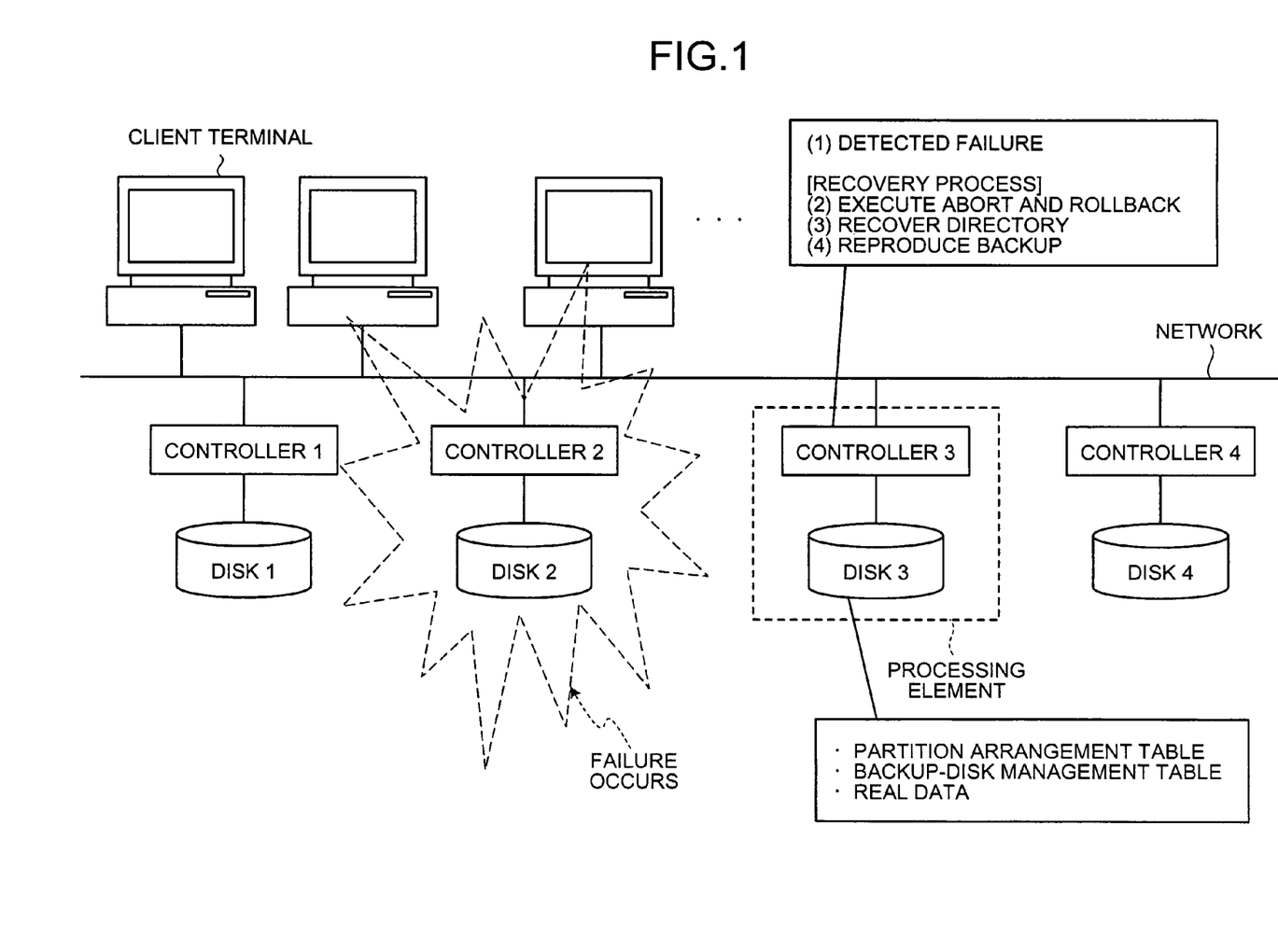
FIG. 1 is a schematic for explaining a concept and a salient feature of a processing element according to an embodiment of the present invention.
Figure 2:
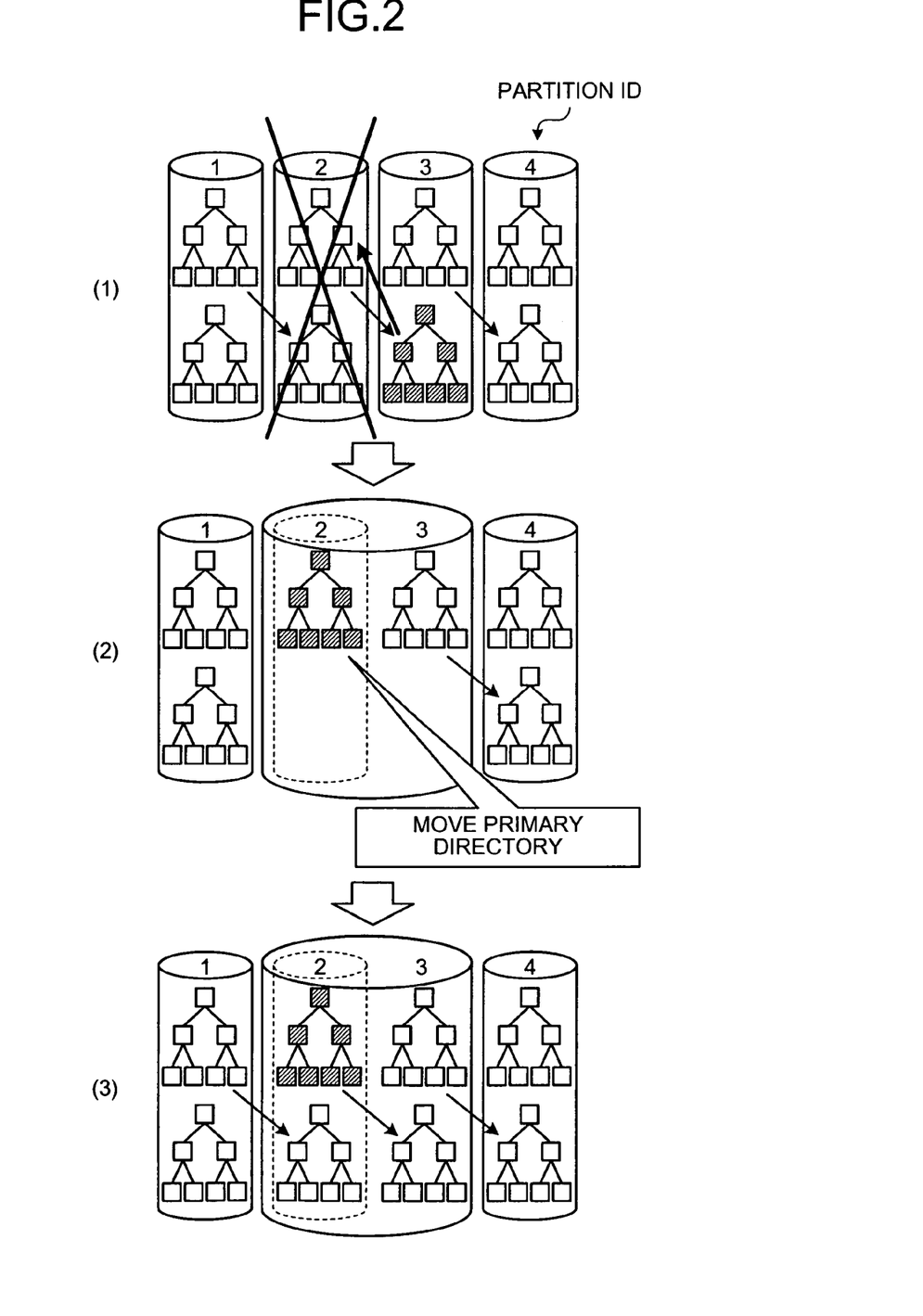
FIG. 2 is a schematic for explaining a concept of a recovery process performed by the processing element.

FIG. 1 is a schematic for explaining a concept and a salient feature of a processing element according to an embodiment of the present invention. FIG. 2 is a schematic for explaining a concept of a recovery process performed by the processing element.

The processing element generally performs a storage control of data related to a plurality of processing elements connected with one another via a network in a storage system. Each of the processing elements stores therein a primary directory, such as a directory with a hierarchical structure of a Fat-Btree, and a backup directory of a primary directory stored in another processing element.

The Fat-Btree is a directory structure improved from a concurrent Btree, which is a directory structure that has been proposed for resolving a bias in a data arrangement.

The Fat-Btree has been developed to achieve high-speed access to data in an autonomous-distributed storage system.

Thus, the processing element according to the embodiment can realize quick recovery of the primary directory and shorten system unavailable time.

As shown in FIG. 1, the processing element includes a controller that mainly controls a disk and the disk that stores therein various data. Each of the processing elements stores, in each of the disks, a partition arrangement table that stores therein a disk identification (ID) that identifies the disk, and a partition ID that identifies a logical memory area virtually arranged in a memory area of the disk in an associated manner.

Each of the processing elements further stores, in the disk, a backup-disk management table that stores therein a primary disk ID and a backup-disk ID in an associated manner. The primary disk ID identifies the primary disk that stores therein a primary directory managed by itself, and the backup-disk ID identifies a backup disk that stores therein a backup directory of the primary directory stored in another processing element. In addition, each of the processing elements stores real data and the like in the disk.

The backup directory of the primary directory stored in a disk 2 is stored in a disk 3. Similarly, the backup directory of the primary directory stored in the disk 3 is stored in a disk 4, the backup directory of the primary directory stored in the disk 4 is stored in a disk 1, and the backup directory of the primary directory stored in the disk 1 is stored in the disk 2.

If continuous socket communication is interrupted, each of the processing elements detects that a failure has occurred (see (1) of FIG. 1). For example, when communication with a processing element including a controller 2 and the disk 2 is interrupted, the processing element including a controller 3 and the disk 3 detects that a failure has occurred in the processing element including the controller 2 and the disk 2. Upon detecting that the failure has occurred in another connected processing element, the processing element performs a recovery process.

Specifically, all the processing elements other than the processing element in which the occurrence of the failure has been detected abort and rollback transaction, which is being executed when the occurrence of the failure is detected and accesses the failed processing element (see (2) of FIG. 1).

The controller (i.e., the controller 3) that has detected the occurrence of the failure restores the directory stored in a disk (i.e., the disk 2) of the processing element in which the failure has occurred (see (3) of FIG. 1).

For example, as shown in FIG. 2, the controller 3 updates the partition arrangement table and the backup-disk management table, and creates a logical memory area (a partition ID "2") in the disk 3. The logical memory area is used to store the backup directory corresponding to the primary directory that has been stored in the disk 2 of the processing element in which the failure has occurred (see (1) of FIG. 2) as the primary directory. Thus, the controller 3 restores the primary directory that has been lost due to the failure.

In other words, by making the backup directory stored in the disk 3 be recognized as the primary directory, the primary directory that has been lost due to the failure is quickly restored. The controller 3 distributes the updated partition arrangement table and the updated backup-disk management table to each of the processing elements.

The controller (i.e., the controller 3) of the processing element that has detected the occurrence of the failure and the controller (i.e., a controller 1) of the processing element whose backup data has been stored in the disk (i.e., the disk 2) of the processing element in which the occurrence of the failure has been detected reproduce each of the backups (see (4) of FIG. 1).

Specifically, the controller 3 stores the backup directory of the primary directory stored in the logical memory area (i.e., the partition ID "2") created in the disk 3, in another logical memory area (i.e., a partition ID "3") existing originally and separately from the created logical memory area. The controller 1 stores the backup directory of the primary directory stored in the disk 1, in the logical memory area (i.e., the partition ID "2") created in the disk 3 (see (3) of FIG. 2).

In this manner, the processing element according to the embodiment can realize quickly recovery of the primary directory and to shorten system unavailable time.

Figure 3:
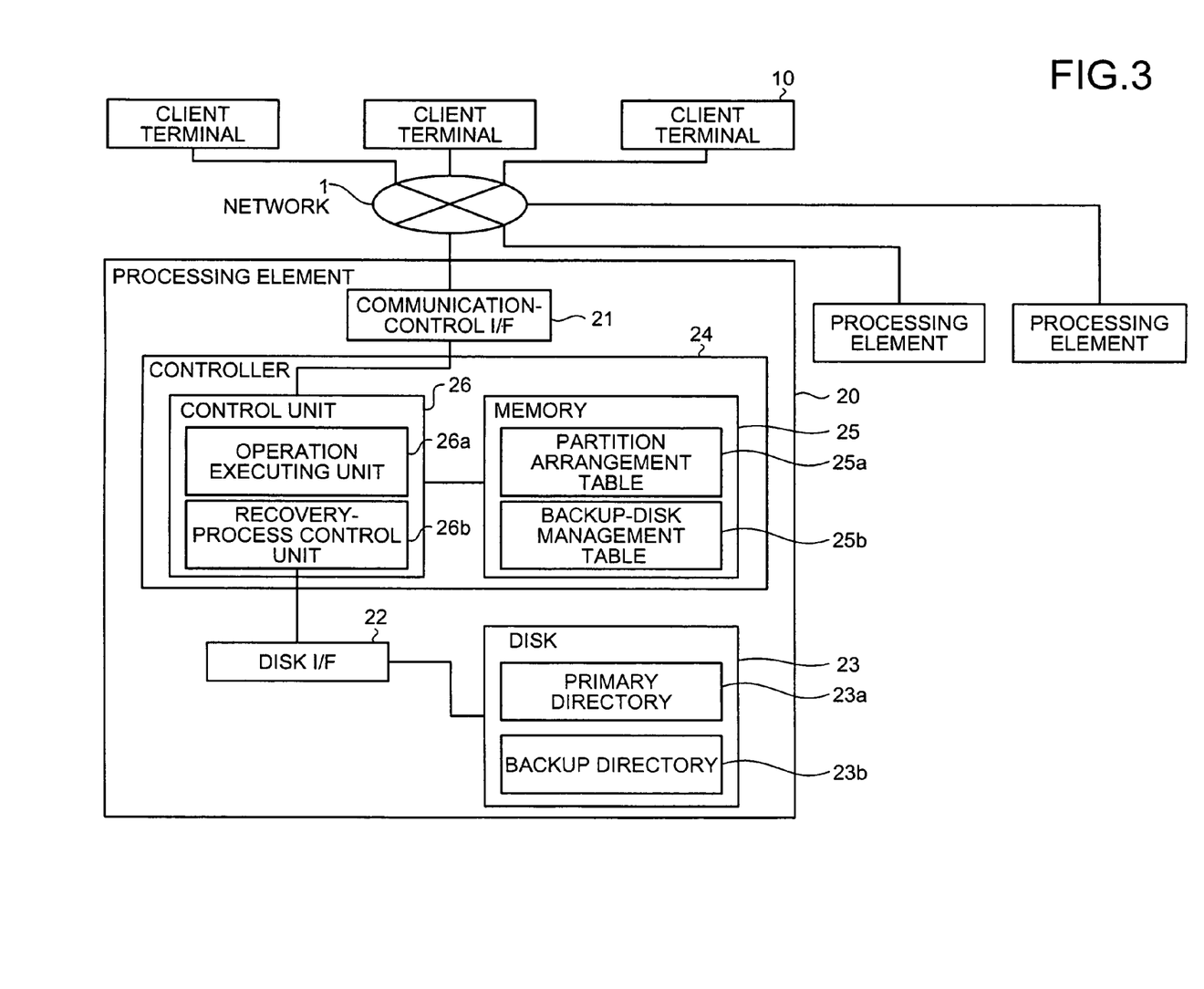
FIG. 3 is a block diagram of the processing element.

FIG. 3 is a block diagram of a processing element 20 according to the embodiment. Processing units necessary for realizing the processing element 20 are exclusively described below and description of other constituent components is omitted.

As shown in FIG. 3, the processing element 20 that constitutes a storage system is communicably connected to a client terminal 10 via a network 1. The processing element 20 includes a communication-control interface (I/F) 21, a disk I/F 22, a disk 23, and a controller 24.

The communication-control I/F 21 controls a communication related to various data transmitted and received between the client terminal 10 and the other processing elements 20. The disk I/F 22 controls a communication related to various data transmitted and received between the disk 23 and the controller 24.

The disk 23 stores therein data necessary for various processes performed by the controller 24, and is configured to store therein a primary directory 23a that functions as an index of real data stored in the disk 23, and a backup directory 23b corresponding to a primary directory stored in the other disk 23 of the other processing element 20.

The controller 24 includes an internal memory for storing therein a predetermined control program, a program that determines various process procedures, and necessary data, and performs various processes with the programs and the data. The controller 24 includes a memory 25 and a control unit 26.

The memory 25 stores therein the data and programs necessary for the various processes performed by the control unit 26. The memory 25 also stores therein a partition arrangement table 25a and a backup-disk management table 25b.

Figure 4:
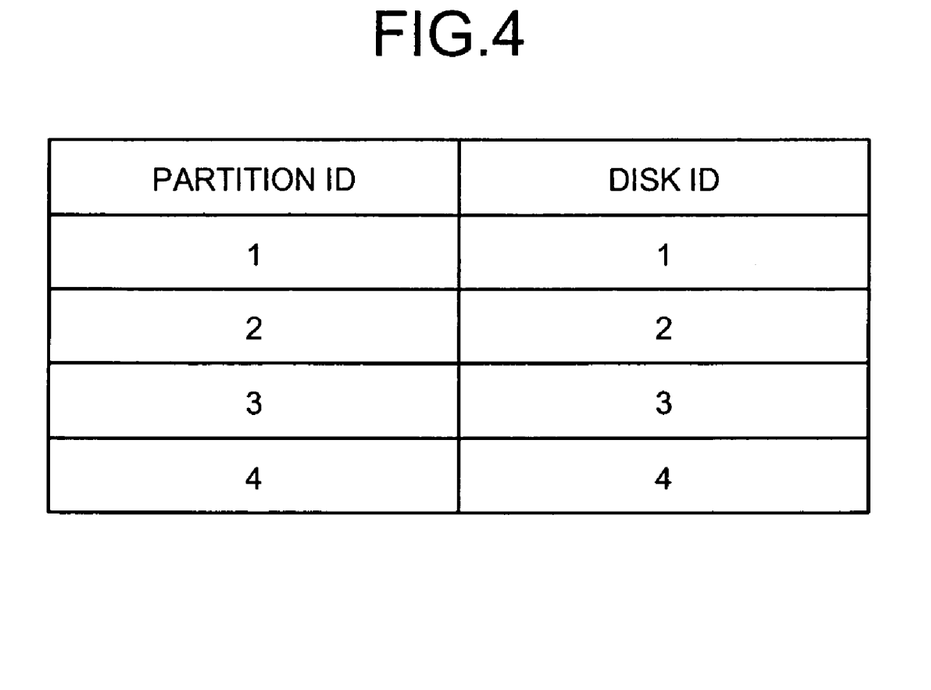
FIG. 4 is an example of the contents of a partition arrangement table shown in FIG. 3.

The partition arrangement table 25a contains various pieces of information about the logical memory area virtually arranged in the disk. Specifically, as shown in FIG. 4, the partition arrangement table 25a contains the partition ID for identifying the logical memory area and the disk ID for identifying the disk. The partition ID is associated with the disk ID.

Figure 5:
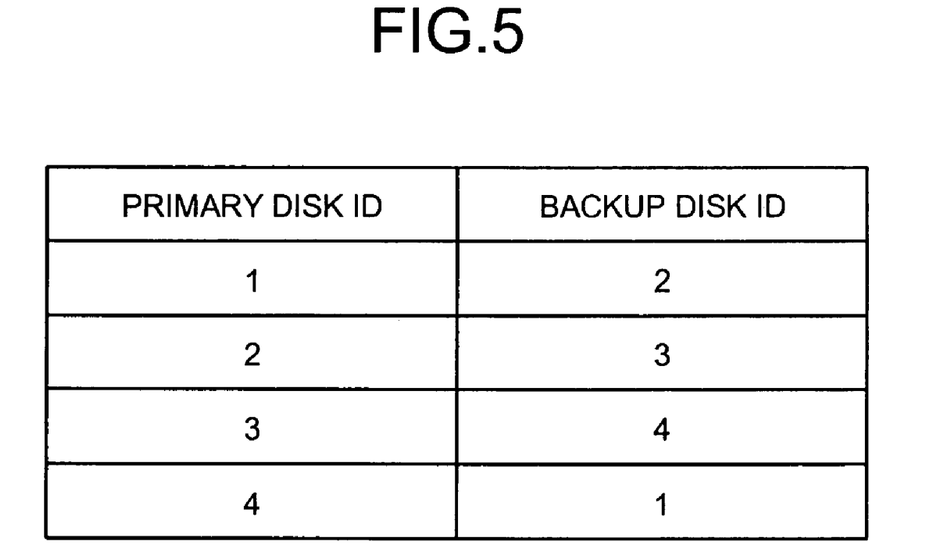
FIG. 5 is an example of the contents of a backup-disk management table shown in FIG. 3.

The backup-disk management table 25b contains various pieces of information about an association relation among the disks. Specifically, as shown in FIG. 5, the backup-disk management table 25b contains the primary disk ID for identifying the primary disk that stores therein the primary directory managed by the same processing element 20, and the backup disk ID for identifying the backup disk that stores therein the backup directory corresponding to the primary directory of the other processing element 20. The primary disk ID is associated with the backup disk ID.

The control unit 26 stores the predetermined control program, the program that determines various process procedures, and the necessary data in the memory 25, and executes the various processes with the programs and the data. In relation to the present invention, the control unit 26 includes an operation executing unit 26a and a recovery-process control unit 26b.

The operation executing unit 26a executes various data processes in response to a request from the client terminal 10. The operation executing unit 26a receives a command from the recovery-process control unit 26b and distributes the updated partition arrangement table 25a and the updated backup-disk management table 25b to the other processing elements 20.

The recovery-process control unit 26b executes the recovery process of data by performing a storage control of the data related to each of the processing elements 20 when a failure has occurred in any one of the processing elements 20.

The recovery-process control unit 26b monitors the socket communication in which the processing element is constantly connected to the other processing element 20, and if the communication is interrupted, the recovery-process control unit 26b detects that the failure has occurred. For example, as shown in FIG. 1, if the communication to the processing element 20 including the controller 2 is interrupted, the recovery-process control unit 26b of the controller 3 detects that the failure has occurred in the processing element 20 including the controller 2. The recovery-process control unit 26b performs the recovery process if detecting the occurrence of the failure in the other processing element 20.

Specifically, the recovery-process control units 26b in all the processing elements 20 other than the processing element 20 in which the occurrence of the failure has been detected abort and rollback the transaction, which is being executed when the occurrence of the failure is detected and accesses the processing element 20 whose primary directory is lost.

The recovery-process control unit 26b in the processing element 20 that has detected the occurrence of the failure restores the directory stored in the disk 23 (i.e., the disk 2) of the processing element 20 in which the occurrence of the failure has been detected.

Figure 6:
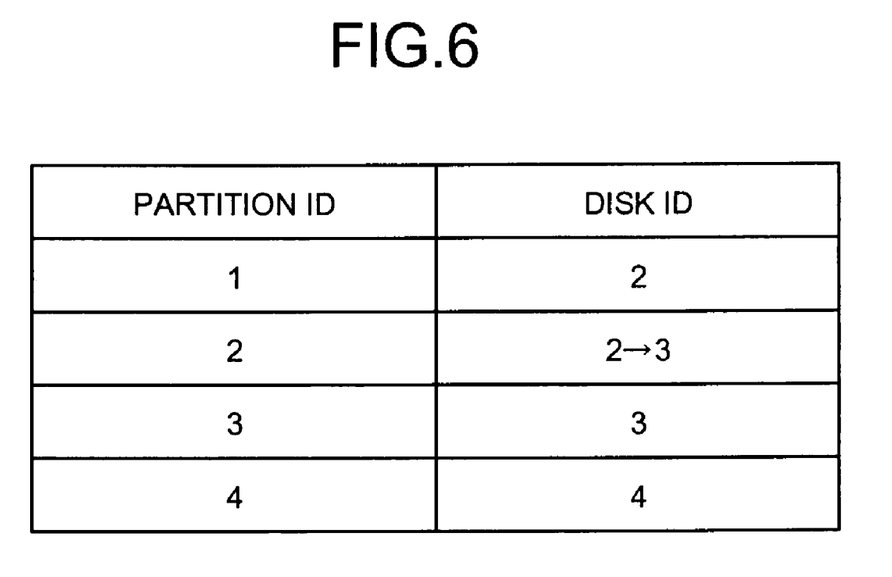
FIG. 6 is another example of the contents of the partition arrangement table.
Figure 7:
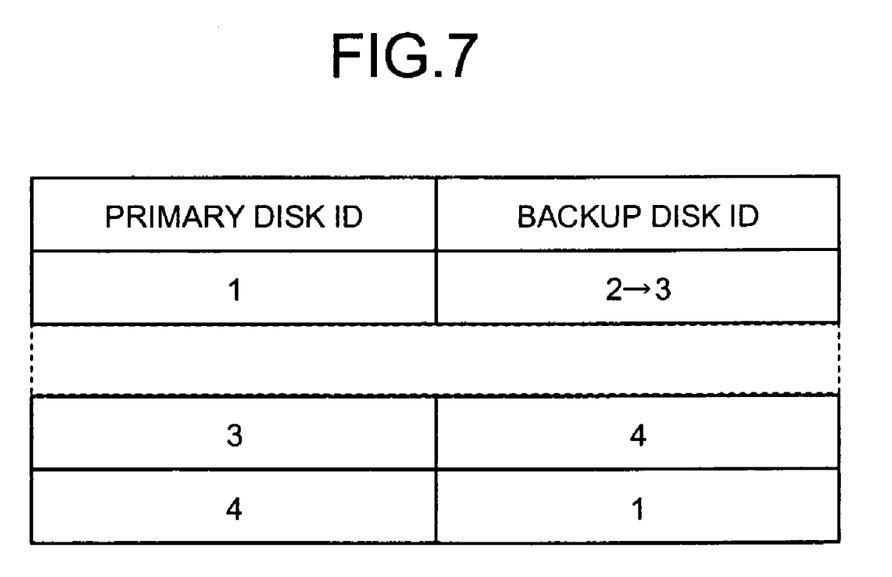
FIG. 7 is another example of the contents of the backup-disk management table.

Specifically, as shown in FIGS. 6 and 7, the recovery-process control unit 26b updates the partition arrangement table 25a and the backup-disk management table 25b, and creates the logical memory area (the partition ID "2") in the disk 3. The logical memory area is used to store therein the backup directory corresponding to the primary directory that has been stored in the disk 2 of the processing element 20 in which the failure has occurred as the primary directory (see (2) of FIG. 2). Thus, the recovery-process control unit 26b restores the primary directory that has been lost due to the failure.

In other words, by making the backup directory stored in the disk 3 be recognized as the primary directory, the primary directory that has been lost due to the failure is quickly restored. The recovery-process control unit 26b issues a command to the operation executing unit 26a for distributing the updated partition arrangement table 25a and the updated backup-disk management table 25b to the other processing elements 20.

The recovery-process control unit 26b of the processing element 20 that has detected the occurrence of the failure and the recovery-process control unit 26b of the processing element 20 that has stored the backup data in the disk 23 (i.e., the disk 2) of the processing element 20 in which the occurrence of the failure has been detected reproduce each of the backups.

Specifically, as shown in FIG. 2, the recovery-process control unit 26b of the processing element 20 that has detected the occurrence of the failure stores the backup directory corresponding to the primary directory stored in the logical memory area created in the disk 3 (i.e., the partition ID "2"), in another logical memory area (i.e., the partition ID "3") existing originally and separately from the created logical memory area. The recovery-process control unit 26b of the processing element 20 that has stored the backup data in the disk 23 (i.e., the disk 2) of the processing element 20 in which the occurrence of the failure has been detected stores the backup directory corresponding to the primary directory stored in the disk 1, in the logical memory area (i.e., the partition ID "2") created in the disk 3 (see (3) of FIG. 2).

The recovery-process control unit 26b can apply the same procedures of recovering the directory and reproducing the backup described above to processes to be performed to recover the real data and to reproduce the backup.

Figure 8:
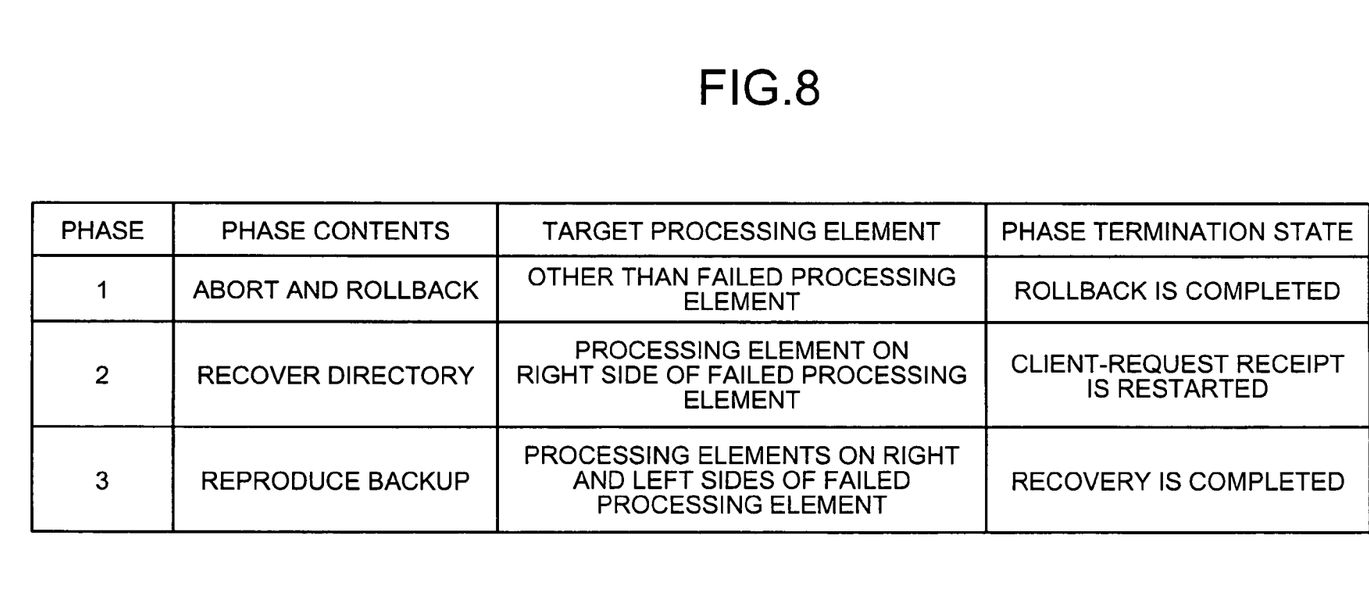
FIG. 8 is an example of the contents of the recovery process performed by the processing element.
Figure 9:
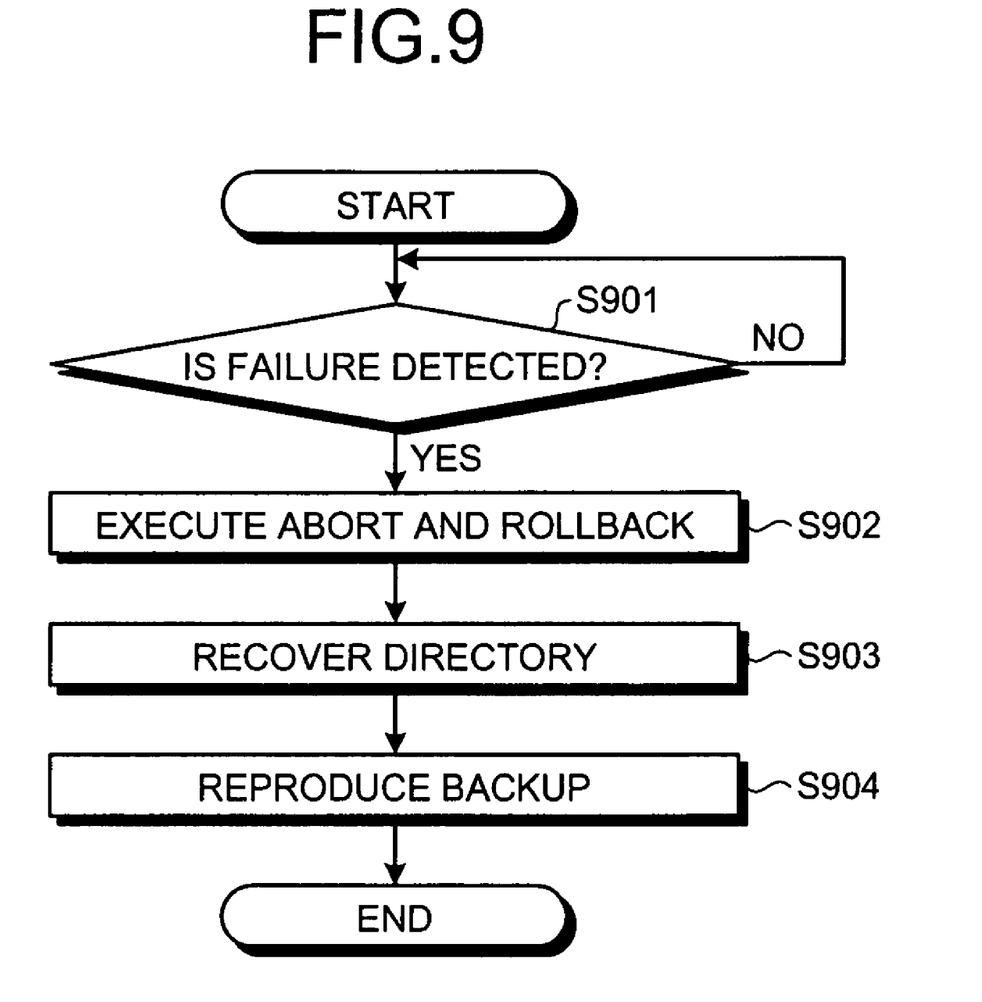
FIG. 9 is a flowchart of a process procedure performed by the processing element.

FIG. 8 is an example of the contents of the recovery process performed by the processing element 20. FIG. 9 is a flowchart of a process procedure performed by the processing element 20.

As shown in FIG. 9, upon detecting the occurrence of a failure in one of the processing elements 20 (step S901), the recovery-process control units 26b of the other processing elements 20 perform the recovery process.

As shown in FIG. 8 (see phase "1"), the recovery-process control units 26b in all the processing elements 20 other than the processing element 20 in which the occurrence of the failure has been detected abort and rollback the transaction, which is being executed when the occurrence of the failure is detected and accesses the processing element 20 whose primary directory is lost (step S902), to return to the previous state (roll back is completed).

The recovery-process control unit 26b of the processing element 20 that has detected the occurrence of the failure restores the directory stored in the disk 23 (i.e., the disk 2) of the processing element 20 in which the failure has occurred (step S903, see phase "2" in FIG. 8).

Specifically, as shown in FIGS. 6 and 7, the recovery-process control unit 26b updates the partition arrangement table 25a and the backup-disk management table 25b, and creates the logical memory area (the partition ID "2") in the disk 3. The logical memory area is used to store therein the backup directory corresponding to the primary directory that has been stored in the disk 2 of the processing element 20 in which the failure has occurred as the primary directory (see (2) of FIG. 2). Thus, the recovery-process control unit 26b restores the primary directory that has been lost due to the failure.

In other words, by making the backup directory stored in the disk 3 be recognized as the primary directory, the primary directory that has been lost due to the failure is quickly restored. The operation executing unit 26a receives the command from the recovery-process control unit 26b and distributes the updated partition arrangement table 25a and the updated backup-disk management table 25b to the other processing elements 20.

The recovery-process control unit 26b of the processing element 20 that has detected the occurrence of the failure and the recovery-process control unit 26b of the processing element 20 that has stored the backup data in the disk 23 (i.e., the disk 2) of the processing element 20 in which the occurrence of the failure has been detected reproduce each of the backups (step S904, see phase "3" in FIG. 8).

Specifically, as shown in FIG. 2, the recovery-process control unit 26b of the processing element 20 that has detected the occurrence of the failure stores the backup directory corresponding to the primary directory stored in the logical memory area (i.e., the partition ID "2") created in the disk 3, in another logical memory area (i.e., the partition ID "3") existing originally and separately from the created logical memory area. The recovery-process control unit 26b of the processing element 20 that has stored the backup data in the disk 23 (i.e., the disk 2) of the processing element 20 in which the occurrence of the failure has been detected stores the backup directory of the primary directory stored in the disk 1, in the logical memory area (i.e., the partition ID "2") created in the disk 3 (see FIG. 7).

As described above, according to the embodiment, if a failure has been detected in any one of the storage units, another storage unit that stores therein backup data corresponding to original data stored in the failed storage unit creates a logical memory area, and stores the backup data in the logical memory area as the original data. For example, if a failure occurs in the processing element 20 in the storage system, backup data of data such as a primary directory stored in the disk 23 of the processing element 20 is recognized as primary data that has been lost due to the failure. Therefore, it is possible to quickly restore the primary data and to shorten system unavailable time.

Moreover, backup data that corresponds to original data stored in another storage unit and that has been stored in the failed storage unit is stored in the logical memory area. Therefore, for example, if a failure occurs in the processing element 20, backup data that corresponds to primary data stored in the disk 23 of the other processing element 20 and that has originally been stored in the disk 23 of the processing element 20 can be reproduced to its original state. Further, backup data of the data stored in the logical memory area as the original data is stored in a memory area different from the logical memory area. That is, for example, if a failure occurs in the processing element 20, backup data of the data that is stored in the logical memory area as the primary data is stored in a memory area different from the logical memory area. Thus, the backup data of the primary data can be reproduced to its original state.

Furthermore, the original data and the backup data have a hierarchical structure. Therefore, for example, if a failure occurs in the processing element 20 in the storage system including a directory having a hierarchical structure such as the Fat-Btree for enabling an effective data search, a backup directory of the primary directory stored in the disk 23 of the processing element 20 is recognized as the primary directory without a time consuming process, such as addition of data, as has been performed to recover the directory. As a result, it is possible to quickly recover the primary directory and to shorten system unavailable time.

The recovery process for the directory having a hierarchical structure such as the Fat-Btree for enabling the effective data search has been explained in the embodiment; however, the present invention is not thus limited. It is acceptable to apply the present invention to a process for restoring real data in such a configuration that the backup data corresponding to the primary data of the real data, i.e., user data, and the backup data corresponding to the primary data stored in the other disk 23 are stored in each of the disks.

The constituent elements of the processing element 20 are functionally conceptual, and need not be physically configured as illustrated. For example, a failure-detection processing function, a directory-recovery processing function, and a backup-reproduction processing function in the recovery-process control unit 26b can be distributed. In other words, a part or all of the constituent elements can be distributed or integrated, either functionally or physically, in any arbitrary units according to various loads and use conditions. A part or all of the processing functions such as the failure-detection processing function, the directory-recovery processing function and the backup-reproduction processing function offered by the processing element 20 as shown in FIGS. 8 and 9 can be realized by a CPU and a computer program analyzed and executed by the CPU, or can be realized as hardware with wired logic.

Figure 10:
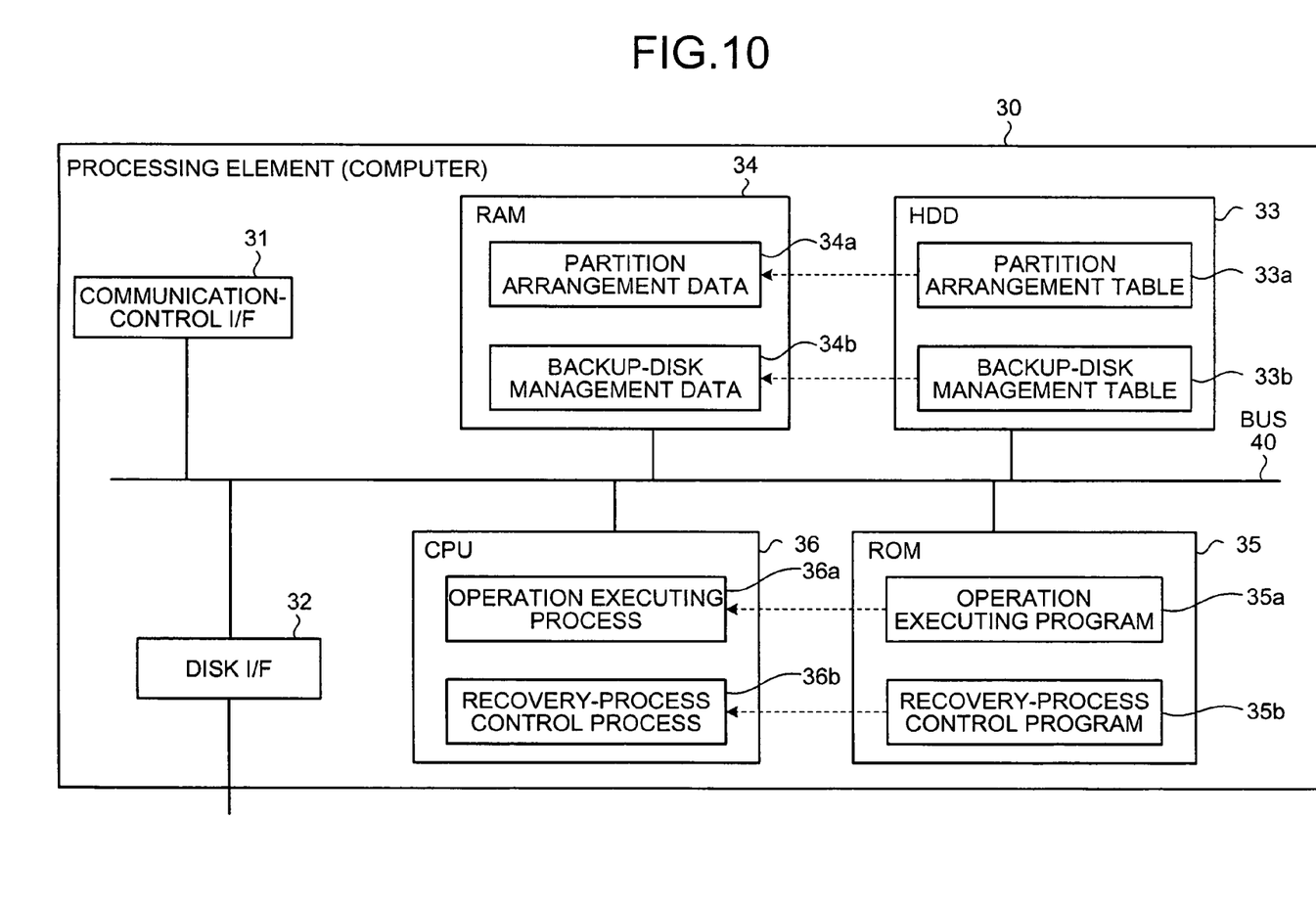
FIG. 10 is a block diagram of a computer that executes a computer program for implementing the recovery process.

A computer program (hereinafter, "recovery process program") can be executed on a computer system such as a personal computer or a workstation to implement the recovery process explained in the embodiment in connection with FIGS. 8 and 9. Such a computer system that executes the recovery process program to realize the same function as the processing element 20 is described with reference to FIG. 10. FIG. 10 is a block diagram of a computer 30.

The computer 30 includes a communication-control I/F 31, a disk I/F 32, a hard disk drive (HDD) 33, a random access memory (RAM) 34, a read only memory (ROM) 35, and a central processing unit (CPU) 36 that are connected with one another via a bus 40. The communication-control I/F 31 and the disk I/F 32 correspond respectively to the communication-control I/F 21 and the disk I/F 22 shown in FIG. 3.

In the ROM 35, the recovery process program is previously stored. In other words, as shown in FIG. 10, an operation executing program 35a and a recovery-process control program 35b are stored in advance in the ROM 35. Similarly to the constituent elements of the processing element 20, the functions of the programs 35a and 35b can be integrated or distributed. The ROM 35 can be a nonvolatile RAM.

As shown in FIG. 10, since the CPU 36 reads out the programs 35a and 35b from the ROM 35 and executes the programs 35a and 35b, the program 35a functions as an operation executing process 36a and the program 35b functions as a recovery-processing control process 36b. The process 36a and the process 36b correspond respectively to the operation executing unit 26a and the recovery-process control unit 26b shown in FIG. 3.

In the HDD 33, as shown in FIG. 10, a partition arrangement table 33a and a backup-disk management table 33b are set. The partition arrangement table 33a and backup-disk management table 33b correspond respectively to the partition arrangement table 25a and the backup-disk management table 25b shown in FIG. 3. The CPU 36 reads out partition arrangement data 34a from the partition arrangement table 33a, reads out backup-disk management data 34b from the backup-disk management table 33b, stores the data in the RAM 34, and performs the recovery process based on the partition arrangement data 34a and the backup-disk management data 34b stored in the RAM 34.

Each of the programs 35a and 35b is not necessarily stored in advance in the ROM 35, and can be stored in a computer-readable recording medium including a removable physical medium, a built-in physical medium, and other computers from which the computer 30 reads out each of the programs. The removable physical medium can be a flexible disk, a compact disk-read only memory, a digital versatile disk, a magneto optical disk, and an integrated circuit card. The built-in physical medium can be an HDD and the like that is provided inside or outside the computer system. The other computers are connected to the computer 30 via a communication line, a local area network (LAN), a wide area network (WAN), the Internet or the like.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage control apparatus that includes a plurality of storage units connected with one another via a network and controls original data and backup data stored in the storage units, the storage units including a first storage unit that stores first original data in a first primary directory and a second storage unit that stores second original data in a second primary directory and backup data of the first original data in a first backup directory, the storage control apparatus comprising:

a failure detecting unit that detects an occurrence of a failure in the first primary directory; and a logical-memory-area creating unit that creates, upon detection of the failure, a logical memory area in the second storage unit, the logical memory area being created in an area separate from the second primary directory and the first backup directory, in the logical memory area, the first backup directory and a second backup directory being allocated, and the first backup directory being allocated as the first primary directory.

2. The storage control apparatus according to claim 1, further comprising a storing unit that stores, in the second backup directory allocated in the logical memory area, backup data of third original data stored in a third storage unit, the third storage unit storing the third original data in a third primary directory and the backup data of the third original data having been stored in a backup directory of the first storage unit.

3. The storage control apparatus according to claim 1, further comprising a storing unit that stores, in the first backup directory, backup data of the first original data stored in the first primary directory allocated in the logical memory area.

4. The storage control apparatus according to claim 1, wherein the original data and the backup data have a hierarchical structure.

5. A storage control method that is applied to a storage control apparatus including a plurality of storage units connected with one another via a network and controlling original data and backup data stored in the storage units, the storage units including a first storage unit that stores first original data in a first primary directory and a second storage unit that stores second original data in a second primary directory and backup data of the first original data in a first backup directory, the storage control method comprising:

detecting an occurrence of a failure in the first primary directory; and creating, upon detection of the failure, a logical memory area in the second storage unit, the logical memory area being created in an area separate from the second primary directory and the first backup directory, in the logical memory area, the first backup directory and a second backup directory being allocated, and the first backup directory being allocated as the first primary directory.

6. The storage control method according to claim 5, further comprising storing, in the second backup directory allocated in the logical memory area, backup data of third original data stored in a third storage unit, the third storage unit storing the third original data in a third primary directory and the backup data of the third original data having been stored in a backup directory of the first storage unit.

7. The storage control method according to claim 5, further comprising storing, in the first backup directory, backup data of the first original data stored in the first primary directory allocated in the logical memory area.

8. The storage control method according to claim 5, wherein the original data and the backup data have a hierarchical structure.

9. A computer-readable recording medium that stores therein a computer program that causes a computer to control original data and backup data stored in a plurality of storage units connected with one another via a network in a storage control apparatus, the storage units including a first storage unit that stores first original data in a first primary directory and a second storage unit that stores second original data in a second primary directory and backup data of the first original data in a first backup directory, the computer program causing the computer to execute:

detecting an occurrence of a failure in the first primary directory; and creating, upon detection of the failure, a logical memory area in the second storage unit, the logical memory area being created in an area separate from the second primary directory and the first backup directory, in the logical memory area, the first backup directory and a second backup directory being allocated, and the first backup directory being allocated as the first primary directory.

10. The computer-readable recording medium according to claim 9, further comprising storing, in the second backup directory allocated in the logical memory area, backup data of third original data stored in a third storage unit, the third storage unit storing the third original data in a third primary directory and the backup data of the third original data having been stored in a backup directory of the first storage unit.

11. The computer-readable recording medium according to claim 9, further comprising storing, in the first backup directory, backup data of the first original data stored in the first primary directory allocated in the logical memory area.

12. The computer-readable recording medium according to claim 9, wherein the original data and the backup data have a hierarchical structure.

* * * * *